(12) United States Patent
Klassen (10) Patent No.: US 11,411,486 B2
(45) Date of Patent: Aug. 9, 2022

(54) GEARBOX

(71) Applicant: Genesis Advanced Technology Inc., Surrey (CA)

(72) Inventor: James Brent Klassen, Surrey (CA)

(73) Assignee: Genesis Advanced Technology Inc., Surrey (CA)

( * ) Notice: Subject to any disclaimer, the term of this patent is extended or adjusted under 35 U.S.C. 154(b) by 24 days.

(21) Appl. No.: 16/652,801

(22) PCT Filed: Oct. 2, 2018

(86) PCT No.: PCT/CA2018/051245
§ 371 (c)(1),
(2) Date: Apr. 1, 2020

(87) PCT Pub. No.: WO2019/068187
PCT Pub. Date: Apr. 11, 2019

(65) Prior Publication Data
US 2020/0235652 A1    Jul. 23, 2020

Related U.S. Application Data

(60) Provisional application No. 62/583,484, filed on Nov. 8, 2017, provisional application No. 62/567,227, filed on Oct. 2, 2017.

(51) Int. Cl.
| | |
|---|---|
| *F16H 1/36* | (2006.01) |
| *H02K 49/10* | (2006.01) |
| *F16H 13/08* | (2006.01) |
| *F16H 49/00* | (2006.01) |

(52) U.S. Cl.
CPC ............ *H02K 49/102* (2013.01); *F16H 1/36* (2013.01); *F16H 13/08* (2013.01); *F16H 49/005* (2013.01)

(58) Field of Classification Search
CPC ........... F16H 13/12; F16H 49/005; F16H 1/36
See application file for complete search history.

(56) References Cited

U.S. PATENT DOCUMENTS

| | | | | |
|---|---|---|---|---|
| 1,737,695 | A | * | 12/1929 | Zadow ..................... F16H 13/04 476/67 |
| 3,354,738 | A | * | 11/1967 | Ivanchich ............... F16H 3/095 74/330 |
| 8,084,912 | B2 | | 12/2011 | Mizushima |

(Continued)

FOREIGN PATENT DOCUMENTS

WO    WO-2013/173928 A1    11/2013

OTHER PUBLICATIONS

International Searching Authority, International Search Report and Written Opinion for International Applicaton No. PCT/CA2018/051245, dated Jan. 25, 2019, (13 pages), Canadian Intellectual Property Office, Quebec, Canada.

*Primary Examiner* — Derek D Knight
(74) *Attorney, Agent, or Firm* — Alston & Bird LLP (57) ABSTRACT

A planetary gearbox with two rows of planets, at least some of the planets including magnets. The planets are driven by a stator to drive the gearbox as a motor. The planets may be geared with axial portions with different helix angle to position the gears and avoid the need for a planet carrier or bearings. Gears with small heights and/or high pressure angles may be used to avoiding or reduce negative effects of conventional gearing.

22 Claims, 8 Drawing Sheets

(56) References Cited

U.S. PATENT DOCUMENTS

| | | | |
|---|---|---|---|
| 8,814,746 B2* | 8/2014 | Fox | F16H 1/2845 475/331 |
| 2015/0119179 A1* | 4/2015 | Klassen | F16C 33/585 475/183 |
| 2017/0089218 A1 | 3/2017 | Hasting et al. | |
| 2017/0181916 A1 | 6/2017 | Klassen | |

* cited by examiner

GEARBOX

CROSS REFERENCE TO RELATED APPLICATIONS

This application is a National Stage Application, filed under 35 U.S.C. 371, of International Application No. PCT/CA2018/051245, filed Oct. 2, 2018, which claims priority to U.S. Application No. 62/567,227, filed Oct. 2, 2017, and U.S. Application No. 62/583,484, filed Nov. 8, 2017; the contents of all of which are hereby incorporated by reference in their entirety.

DESCRIPTION OF RELATED ART

In published patent application no. WO2013173928A1 a device is shown which increases torque with two rows of rollers all of which are contacting two other rollers and at a high enough number of rollers that a low camming angle is achieved. Below this angle, the camming action increases the tractive pressure at the contacts between the inner and outer rollers and between the inner rollers and the inner race and between the outer rollers and the outer race.

Achieving a coefficient of friction that is high enough to allow this camming action to happen is a challenge, because many common material combinations, such as steel on steel, have a lower Coefficient of Friction (CF) than necessary for a typical camming angle for this device. As a result materials such as nickel alloys and other material combinations must be used to achieve a high enough CF to allow the camming angle geometry to provide a tractive pressure that is proportional to the torque being transmitted.

Another challenge with a rolling contact version is to keep the rollers all equally circumferentially spaced. A rolling contact does not "clock" itself relative to the other rollers, and the two rows of rollers are inherently unstable if the circumferential spacing of the rollers is not controlled. By unstable, what is meant is that the inner race will not stay concentric with the outer race if the rollers become unequally spaced.

Another challenge of a pure roller version of the present device (with no gear teeth) is keeping the rollers axially aligned with each other and with the races.

Another challenge of embodiments of a pure roller version of the device is that bearings are required to keep the outer race axially aligned with the inner race.

Another challenge of embodiments of a roller or geared version of this device is that torque must be provided to the rollers through an input device such as a geared ring with an inner gear that meshes with the inner roller array or an outer gear that meshes with the outer roller array.

Geared devices such as conventional gear reducers will commonly use a planet carrier to position the planets. A planet carrier adds rotational mass, cost and complexity.

BRIEF SUMMARY

There is provided a speed change device including an inner race having an outer surface, an outer race having an inner surface, a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers, a permanent magnet carried by a magnet carrying inner roller of the inner rollers or a magnet carrying outer roller of the outer rollers, and a stator having electromagnetic elements for interacting with the permanent magnet to drive the orbital rollers. Each of the inner and outer rollers may carry a respective permanent magnet. The permanent magnet may comprise two permanent magnets axially located by a spacer element within the magnet carrying inner roller or the magnet carrying outer roller. Each respective permanent magnet may comprise two respective permanent magnets axially located by a respective spacer element within the respective inner or outer roller. The inner and outer rollers may be geared and the rolling contact may be geared contact. Each of the inner and outer rollers may have plural axial portions, the plural axial portions of each respective roller having different helix angle. The electromagnetic elements may comprise poles. The poles comprise for example posts or air cores. The number of poles of the stator may be divisible by 3, and may also be divisible by 4. The number of planets containing magnets may differ from the number of poles of the stator for example by plus or minus 2 or plus or minus 4.

There is also provided a speed change device including an inner race having an outer surface, an outer race having an inner surface, a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers, a first axial portion of the inner race having first inner race lobes, the inner rollers having first inner roller lobes configured to mesh with the first inner race lobes, the first inner race lobes having a first helix angle at the first axial portion of the inner race, and a second axial portion of the inner race having second inner race lobes, the inner rollers having second inner roller lobes configured to mesh with the second inner race lobes, the second inner race lobes having a second helix angle at the second axial portion of the inner race different from the first helix angle.

The first inner race lobes may extend continuously between the first axial portion and the second axial portion to link with the second inner race lobes so that the first inner race lobes are the second inner race lobes. The first inner roller lobes may extend continuously to link with the second inner roller lobes so that the first inner roller lobes are the second inner roller lobes.

The term "lobes" as used here may include gears.

There is also provided a speed change device including an inner race having an outer surface, an outer race having an inner surface, a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers, a first axial portion of the outer race having first outer race lobes, the outer rollers having first outer roller lobes configured to mesh with the first outer race lobes, the first outer race lobes having a first helix angle at the first axial portion of the outer race, and a second axial portion of the inner race having second outer race lobes, the inner rollers having second outer roller lobes configured to mesh with the second outer race lobes, the second outer race lobes having a second helix angle at the second axial portion of the outer race different from the first helix angle. The first outer race lobes may extend continuously between the first axial portion and the second axial portion to link with the second outer race lobes so that the first outer race lobes are the second outer race lobes. The first outer roller lobes may extend continuously to link with the second outer roller lobes so that the first outer roller lobes are the second outer roller lobes.

There is also provided a speed change device including an inner race having an outer surface, an outer race having an inner surface, a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers, and the inner race having inner race lobes, the inner rollers having inner roller lobes configured to mesh with the inner race lobes, the inner roller lobes having an inner roller lobe height and the inner rollers having an inner roller radius, a ratio of the inner roller lobe height to the inner roller radius being less than 1/20, 1/30, or 1/40.

There is also provided a speed change device including an inner race having an outer surface, an outer race having an inner surface, a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers, and the outer race having outer race lobes, the outer rollers having outer roller lobes configured to mesh with the outer race lobes, the outer roller lobes having an outer roller lobe height and the outer rollers having an outer roller radius, a ratio of the outer roller lobe height to the outer roller radius being less than 1/20, 1/30, or 1/40.

There is also provided a speed change device including an inner race having an outer surface, an outer race having an inner surface, a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers, the inner rollers and outer rollers being geared, with cylindrical sections between gear meshes. The cylindrical sections may be formed at the pitch circle of the rollers. The cylindrical sections may be formed for example by adding a tooth profile only to the inner side of the pitch circle of the inner rollers and to the outer side of the pitch circle of the outer rollers, or by adding a tooth profile only to the inner side of the pitch circle of the outer rollers and to the outer side of the pitch circle of the inner rollers. The gears may be helical, and may be arranged so that at any point in time at least a portion of the cylindrical surfaces of each contacting gear pair are in contact.

Any of these embodiments may be combined together.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION OF VARIOUS EMBODIMENTS

Immaterial modifications may be made to the embodiments described here without departing from what is covered by the claims.

Embodiments of the present device eliminate the need for a planet carrier by transmitting torque from an inner fixed ring to an outer output ring directly through two rows of planets. The gear reduction ratio is determined by the difference between the OD of the inner ring and the ID of the outer ring with the inner and outer planets acting as a torque transfer load path between them. As the planets are caused to orbit, the outer ring will rotate at a ratio such as approximately 3:1 or possibly lower, or up to approximately 6:1 or possibly higher. The closer the OD of the inner ring is to the ID of the outer output ring, the greater the ratio.

Embodiments of the device disclosed here use a combination of features to provide equal circumferential spacing as well as axial alignment of the rollers and races as well as eliminating the need for additional bearings in some applications or reducing the strength (and therefore the cost and weight) of the additional bearings by virtue of the interaction of the rollers and races providing axial alignment from the inner race to the outer race. Furthermore, embodiments of the device disclosed here provide a structure that applies a magnetic force directly to the rollers to eliminate the need for a separate motor rotor where the rollers themselves act as the rotor with a reduction ratio because they are orbiting at a higher speed than the output ring. This eliminates the need for a sun ring input which simplifies the manufacturing and assembly of the motor-gearbox combination. The fact that the rollers (and therefore the contained magnets) are spinning is not believed to be a significant detriment because they are still providing magnetic flux to the airgap and stator.

Embodiment of the device use gears or lobes that are small enough and numerous enough to provide what acts and feels more like a rolling contact than a gear. In the claims, the term "lobes" also encompasses the term "gears". Lobes have the advantage of providing a high surface area in the radial direction (as opposed to a gear that has gear teeth which act like wedges). In an example, the pressure angle of the lobes or gears may be greater than 20, 30 or 40 degrees. In an alternate configuration, high angled gears can be used instead of lobes. By configuring the gears or lobes in a herringbone configuration, a number of characteristics can be achieved, including: circumferential roller spacing as a result of the gear-specified circumferential positioning of the rollers; axial alignment of rollers to races and inner rollers to outer rollers as a result of the herringbone helical gears; and the ability to eliminate or reduce the need for a bearing between the inner and outer races because the herringbone gears on the rollers provide multi-axis (IE: radial and axial location) constraints. The use of permanent magnets in the rollers allows one or preferably two electromagnetic stators positioned on axial ends of the device to be commutated in such a way as to impart rotational torque and motion to the rollers, and by doing so to generate torque on the outer ring (using the inner ring as a fixed reference in these non-limiting examples, although it is understood that the outer ring can be used as the fixed reference and the inner ring can be the output ring. It is also understood that the stator/s can be attached to the inner or outer ring regardless of which one is fixed and which one is the output).

Embodiments Including Permanent Magnets

A typical conventional differential gear with a planet carrier cannot use PMs in the planets because it requires bearings and shafts in the pinions. Furthermore, if a conventional planetary gear (with a single circular array of planets) uses PMs in the planets together with a fixed sun gear it will act as a speed increaser rather than as a reducer.

Figure 1:
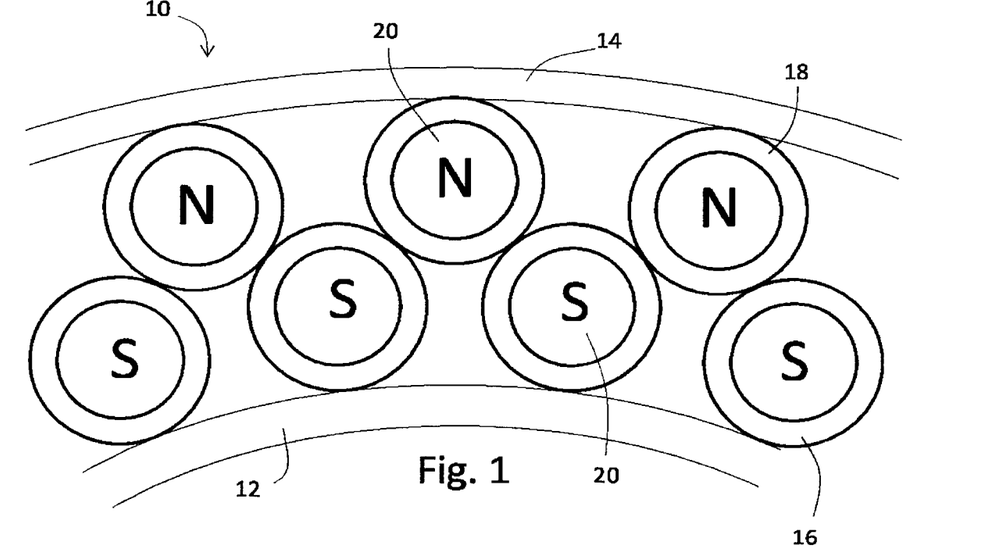
FIG. 1 is a simplified schematic axial end view of a portion of a motor comprising a gearbox with magnetic pinions.

In FIG. 1, a simplified schematic is shown of a section of a non-limiting exemplary embodiment of the device 10. An inner race 12 acts as a fixed or reference race, an outer race 14 acts as an output member, and respective arrays of inner rollers 16 and outer rollers 18 impart torque form the inner race 12 to the outer race 14 when they orbit. In order to cause the rollers to orbit, embodiments of the device have a permanent magnet 20 imbedded in one or more of the rollers and preferably, as shown in FIG. 1, all of the inner and outer rollers.

Figure 2:
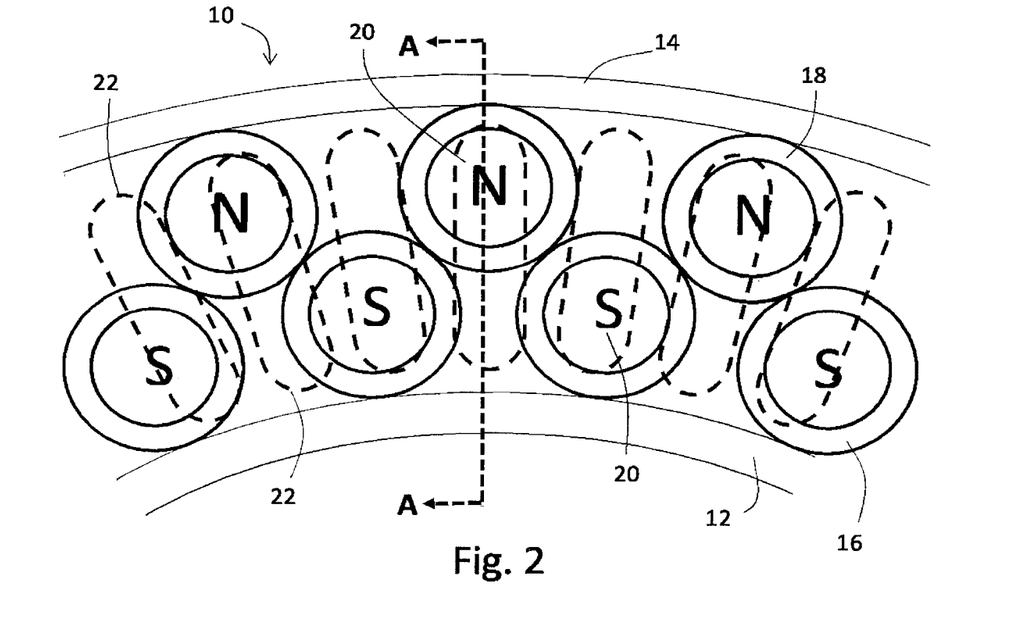
FIG. 2 is a simplified schematic axial end view of the portion of a motor of FIG. 1, also showing electromagnetic stator poles/posts represented by dashed lines.
Figure 3:
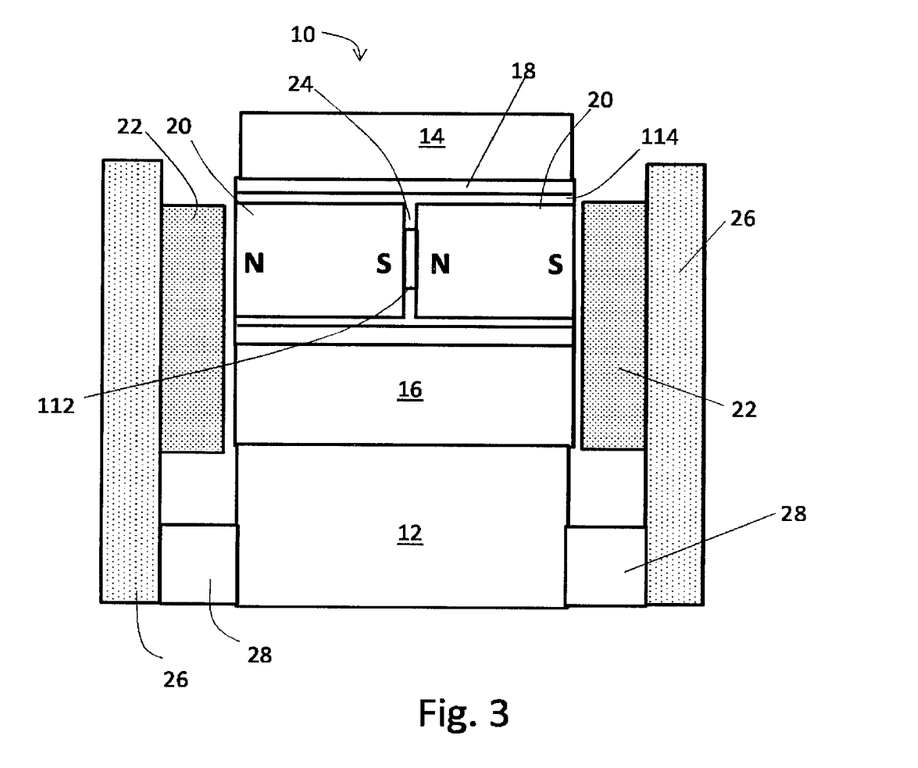
FIG. 3 is a schematic circumferential section view of the exemplary embodiment in FIG. 2 with a partially assembled stator on both axial ends of the rollers.

FIG. 2 shows a simplified schematic view of an embodiment of the device 10 with electromagnetic stator poles/posts 22 represented by dashed lines. A range of numbers of rollers and posts can be used such as could be used in a conventional electric motor and stator such as 72 stator posts and 68 rollers. The number of rollers in this non-limiting example includes 34 inner rollers and 34 outer rollers. The stator may have electromagnets with posts or air coils. Also shown in FIG. 2 is a section line A-A showing where the cross section view of FIG. 3 is cut. The section line cuts through an outer roller but between inner rollers. If air coils are used, it is preferable to have a soft magnetic material backiron 26 to carry flux from each air coil 22 to each adjacent air coil 22.

FIG. 3 shows a schematic cross section of the non-limiting exemplary embodiment in FIG. 2 with a partially assembled stator on both axial ends of the rollers. (Coils on electromagnetic elements are not shown). The placement of the permanent magnets 20 is such that two magnets are used and placed in the outer rollers 18 from either end such that they pull together across a separating or axially locating member 24. This allows the magnets to be held in the rollers without the need for additional securing means. This provides the full end of the magnet for propulsive force when interacting with the electromagnetic stator poles 22. Other means of inserting and securing the magnets may also be used. The inner rollers may use the same or different arrangement as the outer rollers. Stator elements including poles (here air coils) 22 and backiron 26 are shown schematically. As shown, the stator elements may be on both axial sides of the device 10. The stator may be attached to a fixed element, here the inner race 12. Here, spacers 28 are used to connect the backiron 26 to the inner race 12.

The axially locating member 24 need not separate the magnets. The member 24 merely prevents the magnets from moving together. If separated, such as with two simple cylindrical PMs that are separated by a ring of plastic (if plastic gears are used) to form axially locating member 24, then there needs to be a soft magnetic material, such as steel, disk 112 between them. This is a preferred construction in terms of cost and simplicity.

The axial location element 24 is preferably molded or fabricated as one piece with at least an inner portion 114 (inner diameter) of the rollers. The entire roller can be formed as a single piece, or the gear faces of the roller may be one or more separate pieces into which the inner portion 114 is inserted. A soft magnetic material, such as steel disk 112, is preferably used as a flux linkage path between the two magnets. The PMs could also have a smaller diameter cylindrical end section instead of the soft magnetic material disk. Simple cylindrical magnets are considered to be less expensive to build, and the use of a steel disk spacer for flux linkage between them allows this disk to be easily adjusted to the ideal thickness (whereas PMs are more difficult to machine to the same tolerance).

The embodiment shown in FIGS. 1-3 has 2 rows of pinions (rollers) of similar size, with magnets in the pinions of each row. The magnets have (as viewed from one axial side) all N in one array and all S in the other array, as seen in FIGS. 1 and 2. Some configurations use one array of pinions that are much smaller than the other. In this case it may be better to put magnets in only the larger pinions. The benefits include a lighter stator due to smaller radial dimension. The magnets can be restricted to one row regardless of the pinion sizes. An example, shown in versions with 16 and 14 pinion per row respectively in FIGS. 4-5, has larger outer rollers 18 with magnets 20 only in the outer array.

This single row of magnets configuration has alternating polarities of the magnets in single array of PM pinions.

The stator may have a number of poles. Each pole can be for example an electromagnet having a post, or an air coil. For a conventional three phase motor, the stator needs to have a number of poles divisible by 3 (the term "poles" or "posts" when referring to the stator, refers to each individual post and coil, or coil, if air coils are used). It can also be useful to have the number of poles divisible by 4, so if it is both divisible by 3 and divisible by 4 it is divisible by 12.

The number of rotor posts (rotor posts, here, refers to the number of rollers with permanent magnets of alternating polarity relative to adjacent rollers with magnets) is then based on the number of stator posts and, for a concentrated winding, the number of rotor posts is greater than or lesser than the number of stator posts. For example −2 or +2, but −4 or +4 is preferred, because this distributes the magnetic force around the air gap to reduce the bending load on the stator. Other differences will work also.

Here, the number of rotor posts is the number of pinions with magnets in them, which is typically either the number of total pinions or the number of pinions in one of the rows of pinions.

Figure 4:
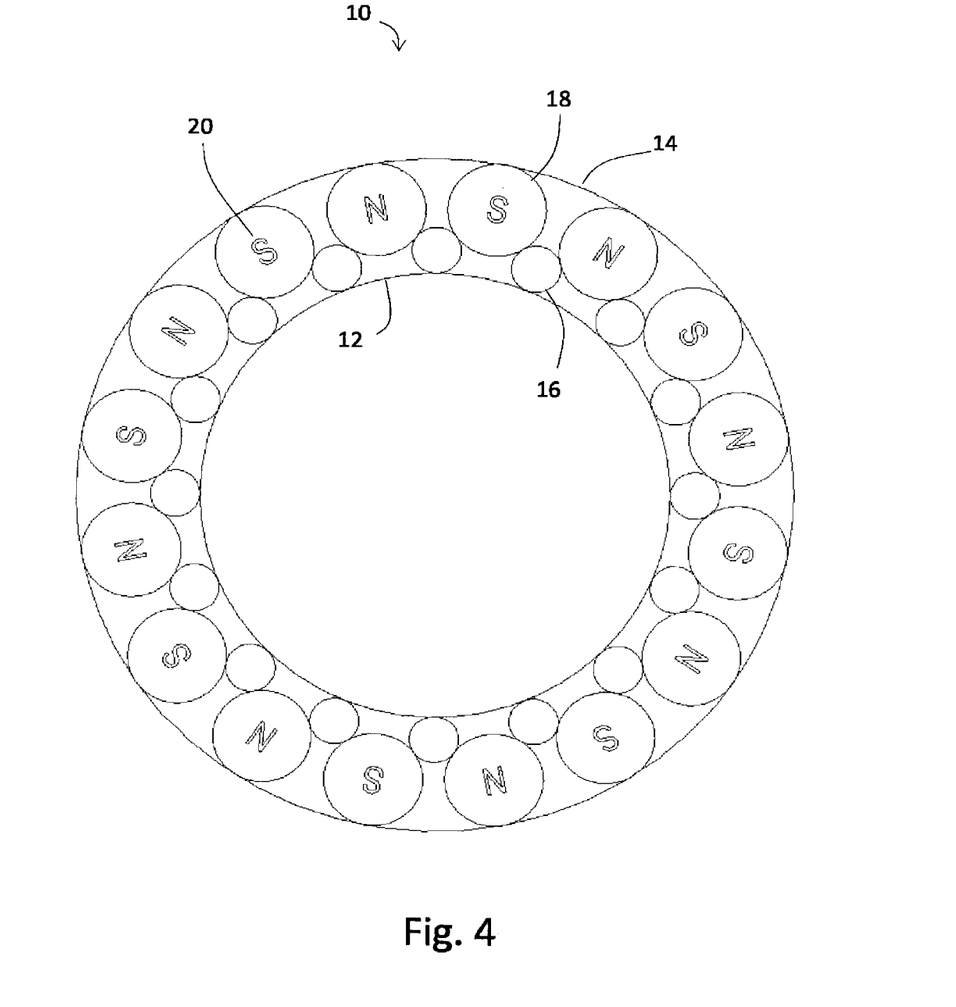
FIG. 4 is a schematic cross section of an exemplary embodiment of a gearbox having larger outer pinions than inner pinions, with 16 pinions per row, and the larger row of pinions having magnets.

An example of a suitable number of pinions in a row, in an embodiment with magnets in one row of pinions, is 16, as shown in FIG. 4.

The embodiments shown in FIGS. 1-5 are referred to here as sunless self-energizing gearboxes. These embodiments are quite simple. They each have only one (typically fixed) inner ring and one outer ring (typically connected to an output). The rollers act as bearings, reducing or eliminating the need for conventional bearings. This is a simple and low-cost actuator for anything that needs a high speed like an exoskeleton. Embodiments disclosed in this application could be used for example in an exoskeleton as disclosed in US patent application publication no. 2017/0181916.

Figure 5:
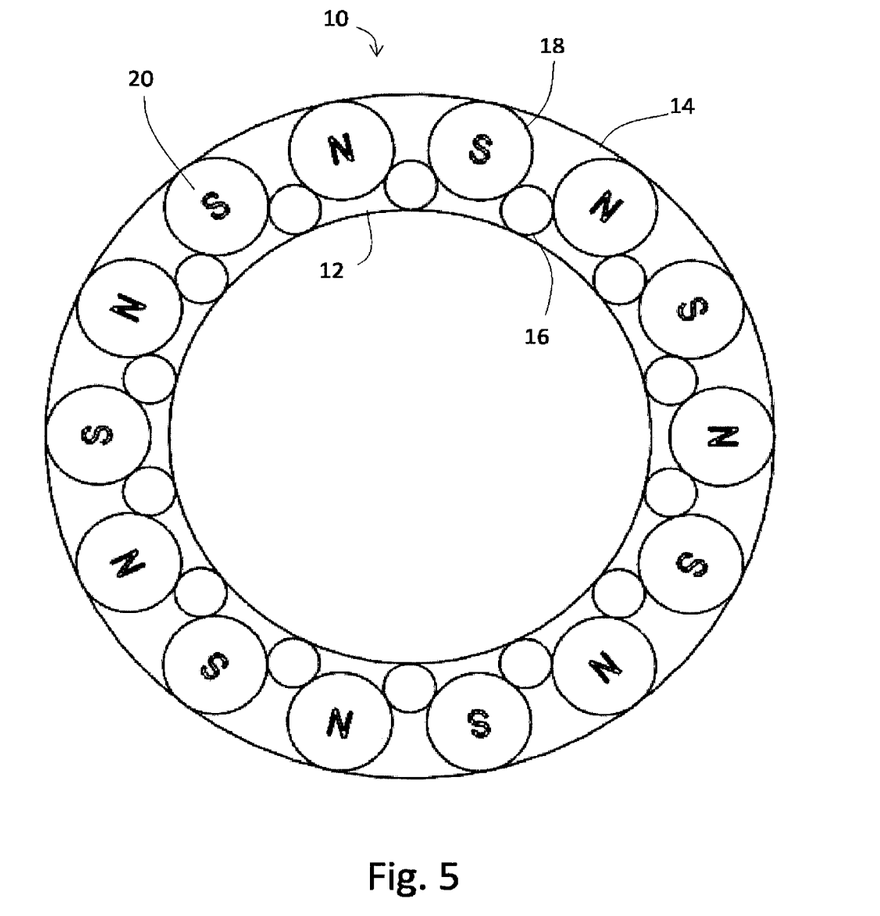
FIG. 5 is a schematic cross section of an exemplary embodiment of a gearbox having larger outer pinions than inner pinions, with 14 pinions per row, and the larger row of pinions having magnets.
Figure 6:
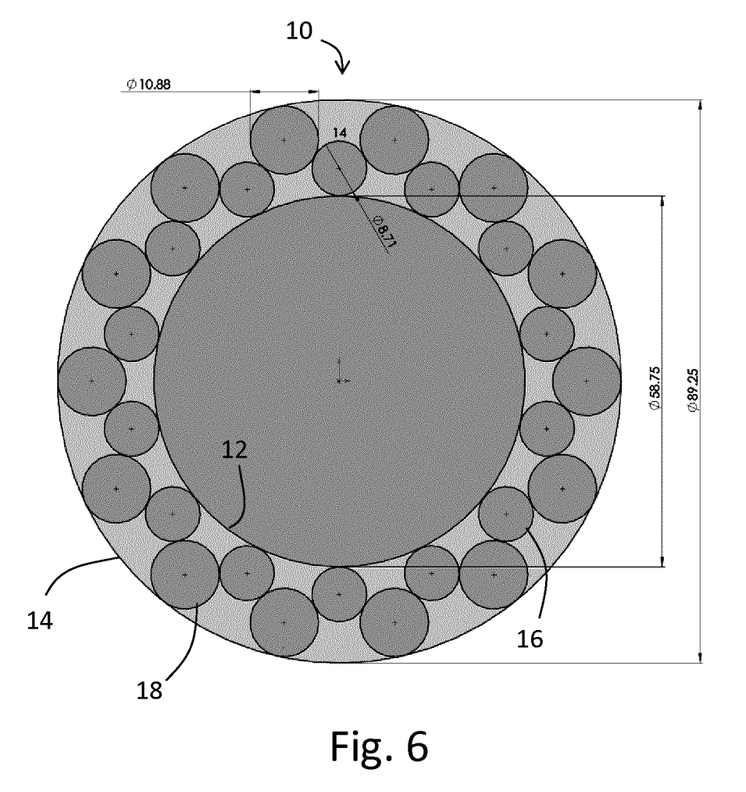
FIG. 6 is a schematic cross section of an exemplary embodiment of a gearbox having larger outer pinions than inner pinions.

FIG. 6 shows an embodiment with 14 pinions per row, with a less extreme difference in pinion sizes than in FIG. 5. No magnets are shown.

Gear or Lobe Configurations

Figure 7:
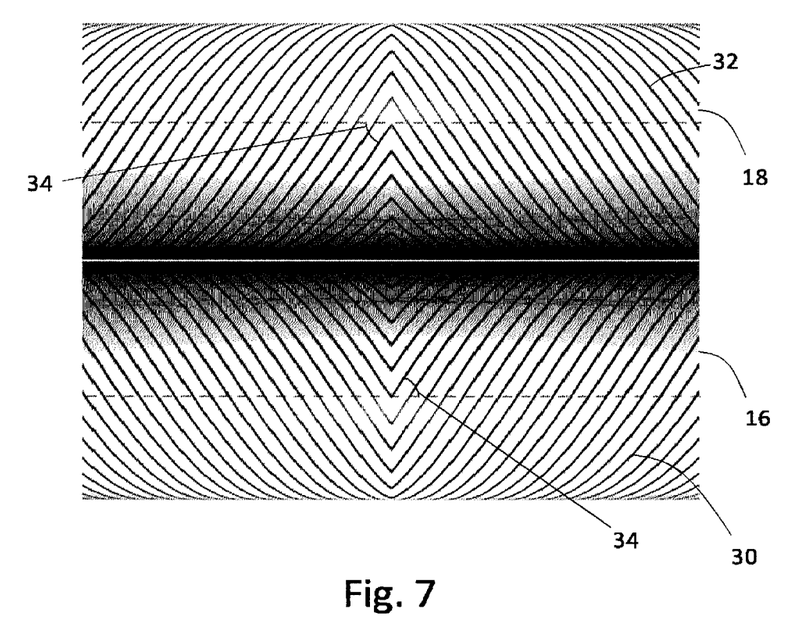
FIG. 7 is a schematic side view of two rollers showing an exemplary gear pattern.

FIG. 7 shows a non-limiting example of inner herringbone gears or lobes 30 on inner roller 16 and outer herringbone gears or lobes 32 on outer roller 18. The gears or lobes 30 and 32 are shown schematically by lines. The gears or lobes 30 and 32 would mesh, though in this figure the gears appear slightly separated. The herringbone gears or lobes help constrain axial positioning of the rollers. The axial positioning may be constrained by any use of gears or lobes that have a different helix angle at different portions of a roller simultaneously in contact with a surface or another roller. The herringbone shape shown in FIG. 7 is only one example of this. To distinguish from the "pressure angle" defined below, the angle referred to in this paragraph, being an angle of the lobe peaks or troughs away from an axial direction, will be referred to as a helix angle. The helix angle 34 (represented by an arc connecting a line showing a lobe 30 to a dotted line parallel to the axis) is opposite on different axial portions of the rollers in this embodiment. This opposite, non-zero angle is an example of different helix angles on different axial portions.

Figure 8:
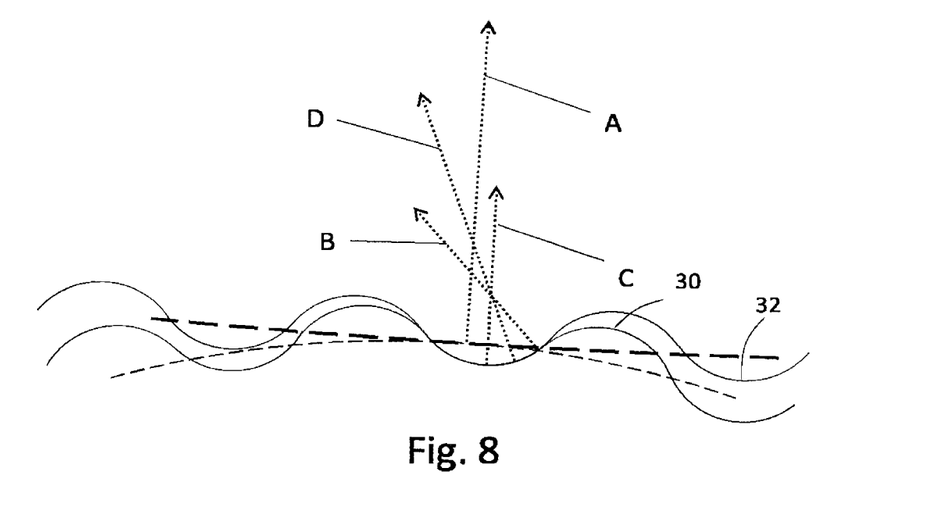
FIG. 8 is a diagram showing a simplified example of a low angle lobe profile.

Although this device could possibly be configured to work with traction surfaces, the use of lobes as for example shown in FIG. 8 will have the effect of increasing the apparent coefficient of friction by preventing sliding at higher angles between the gears. A high effective pressure angle lobe can therefore be used such as a sine wave profile as long as the average maximum pressure angle when under load is low enough to prevent the lobes or gear faces from disengaging.

A simplified example of a high effective pressure angle lobe profile is shown in FIG. 8. A high effective pressure angle lobe geometry is believed to allow a high rolling contact capability by increasing the radially active surface area. The combination of the self-camming effect that increases the radial contact force with increased torque and this low effective pressure angle lobe geometry is expected to result in minimal sliding and therefore low rolling friction.

High effective pressure angle—In a conventional gearbox, a high pressure angle would result in a high separating force between the gears during torque transfer. In embodiments of the device, the lobe pressure angle is low enough to increase the effective friction coefficient of the contact areas so a camming angle is established. Once this critical effective friction coefficient (EFC) is established, the self-energizing effect will cause the rollers to increase the traction pressure rather than to slide or skip. FIG. 8 depicts lobe contact between a roller and race. The dashed curves represent the pitch diameter of a roller on the bottom and a larger diameter race on top. The long dashed line A represents the actual contact angle if it were a non-geared interface and is in the radial direction relative to the axis of the roller. Line B represents the maximum pressure angle during the lobe mesh as the roller rolls on the race and is normal to the surface of the lobe. Line C represents the minimum pressure angle during the load mesh as the roller rolls on the race and is normal to the surface of the lobe. During torque transfer, the contact pressure is biased in one direction so there is no effective contact in the opposite direction of contact line B. As a result of this contact pattern, the average effective pressure angle is along line D, approximately halfway between lines B and C.

As described in WO2013173928A1, each of the inner race and outer race may be circular and centered on an axis. A traction angle $\varnothing_i$ may be defined as follows: for each pair of a first inner roller that contacts a first outer roller, the traction angle $\varnothing_i$ is defined as the angle between a first line extending outward from the axis through a center of the first inner roller and a second line extending from the contact point of the first outer roller with the outer race and a contact point of the first inner roller with the inner race. Orbital motion the rollers leads to differential motion between the inner race and outer race, and thus torque forces are transmitted between the inner and outer races via the rollers. The torque forces are transmitted between the contact points of adjacent rollers and thus are transmitted at the traction angle having a ratio of a circumferential component to a radial component equal to the tangent of the traction angle. Thus, as described in WO2013173928A1 (the content of which is incorporated by reference herein), for traction surfaces if a coefficient of friction between the inner race and inner roller is greater than the tangent of the angle, the torque will generate a radial component sufficient to maintain traction as the torque increases, without requiring a large preload or any additional mechanism to increase radial loading. This is referred to herein as the "camming effect"; a device exhibiting this camming effect may also be referred to herein as "self energizing".

With gears or lobes on the rollers, the coefficient of friction is not relied on to create a self-energizing effect to keep the rollers from rotationally sliding on each other. Instead, the gears or lobes serve to time the rollers to each other and to their respective races.

In an embodiment shown in FIG. 7, the lobes cover substantially a full radial surface of the rollers, and the inner roller lobes mesh with both outer roller lobes and inner race lobes, and the outer roller lobes mesh with both inner roller lobes and outer race lobes. However, it is also possible to have lobes only on a portion of the rollers. Also, it is possible to have a different portion of the rollers, and thus possibly different lobes, in contact with the corresponding race than with the adjacent rollers. One could also have different selections of lobes, gears, or traction surfaces for the different contacts.

Gear Tooth Profile

Embodiments of the present device use a geared contact between the two rows of planets and between planets and races. This geared contact allows a larger camming angle and potentially higher torque transmission. One challenge to be solved with a geared contact is that the radial compression between geared components can result in non-conjugate motion, and high friction and cogging as a result of the wedging effect of teeth of one planet acting as wedges that are being forced between the receiving teeth of the meshing planet. This wedging effect results in a high mechanical advantage of the radial force between the pinions planar to the gear contact faces resulting in high friction and wear. Forcing gears together radially will also result in a variable friction force as the mechanical advantage changes throughout different phases of the gear tooth contact during pinion rotation. This variable friction force can result in cogging and irregular wear.

A new gear tooth profile for the device provides a combination of rolling contact at a coefficient of traction, combined with an involute gear tooth profile that provides the rest of the torque transfer not provided by the rolling contact.

The use of a cylindrical rolling contact surface between the gear teeth, as described here, and if used with spur gears, will reduce the amount of geared contact (IE: it will reduce the contact ratio). At a high enough percentage of cylindrical rolling contact, a geared contact ratio of less than 1 will occur. Up to this ratio, it is difficult or impossible to achieve a rolling contact ratio of greater than 1. The use of a helical tooth pattern as described here, can provide a continuous rolling contact between gears as well as a continuous geared contact for smooth rolling contact and uninterrupted geared torque transmission. Helical teeth having helical direction at different axial portions of rollers can form herringbone teeth.

Figure 9:
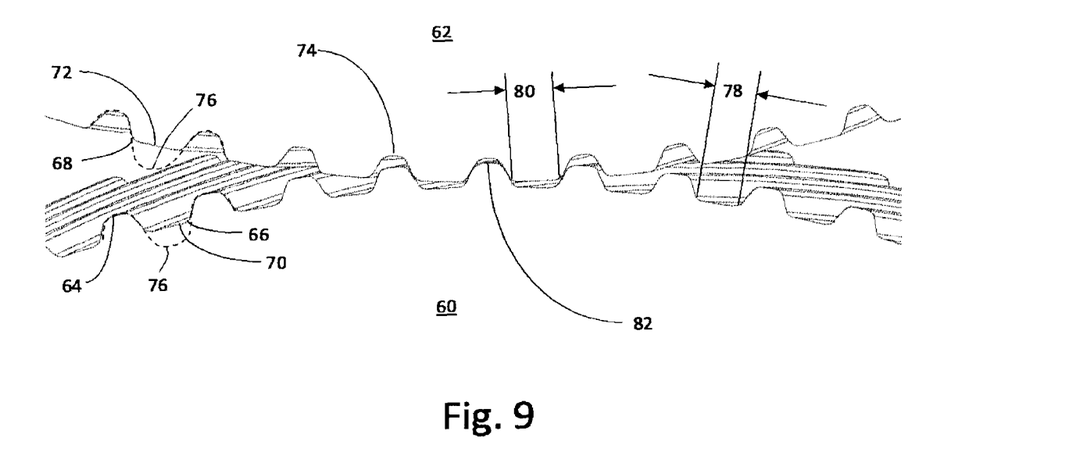
FIG. 9 is a cross section view of meshing planet gears.

In an embodiment, shown in FIG. 9, a helical gear 60 with a exemplary modified involute shape is used for the inner row of planets. Inner planet gear 60 meshes with outer planet gear 62. The OD of the inner planet gear teeth 64 is not necessarily modified, but to provide rolling contact with the outer row of planets, the root 66 of the inner planet teeth is created larger than usual as a cylindrical surface 70 to provide a cylindrical rolling contact with the tips of the outer planet teeth 68. The root 74 of the outer planet teeth are not modified, but the OD of the outer planet teeth 68 are created with shortened tips compared to a conventional gear tooth profile 76 and the tips have a cylindrical surface 72 which meshes in rolling contact with the root 66 of the inner planets. In this way, when combined with a helical gear tooth profile, rolling contact can be maintained at all times between the unusually large cylindrical surface area 70 and the unusually large cylindrical surface area 72, and a geared contact can also be maintained at all times. In an optimized configuration of this gear tooth profile, the involute shape of the gear faces will be tailored to provide conjugate gear motion with the rolling contact diameter being used as the pitch diameter of both gears. Note that with this gear tooth geometry, the cylindrical distance of area 78 corresponding to flat-bottomed roots of one gear will be approximately equal to the cylindrical distance of the area 80 corresponding to flat-topped tips of the other gear. This angular distance can be increased by decreasing the angular size of the teeth as shown by narrow teeth 84 in FIG. 10.

Figure 10:
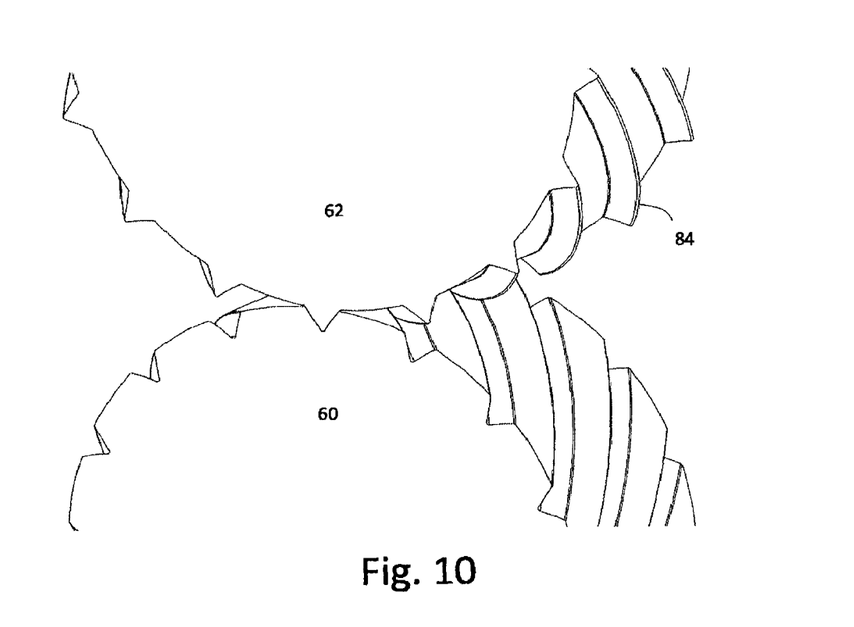
FIG. 10 is a cross section view of another embodiment of meshing planet gears.

The same rolling/geared contact principle applies to the outer planet mesh with the outer ring gear (not shown in FIGS. 9 and 10). In this case the root of the outer ring gear teeth is cylindrical and has a reduced ID compared to a conventional gear. This cylindrical root of the outer gear rolls on the cylindrical OD of the shortened outer planet gear teeth.

The inner fixed ring gear teeth mesh with the inner planet gears by virtue of the root of the ring gear teeth being relatively unmodified and the cylindrical ID of the inner fixed ring gear being reduced to increase the surface area of this cylindrical surface.

In this way (or by way of other variations) material is added to the root of a first meshing gear in a meshing set thereby increasing the material in the root in a cylindrical surface for rolling contact while material is removed from the tooth tips of the second meshing gear teeth so the roots of the teeth on the first gear roll on the tips of the teeth of the second gear. Clearance is then created between the tips of the first gear and the roots of the second gear (as shown at 82 in FIG. 9) so the relative motion of these tips and roots which are not coaxial with the pitch diameters of the gears, does not increase the friction of the gear mesh.

For many applications, such as many robotic applications, some backlash is tolerated in the circumferential direction of the gear mesh because the traction between the cylindrical rolling surfaces will reduce the feeling of backlash during direction changes. This results in a smooth transfer of torque with low friction with the reduced-size gear teeth providing timing and axial location of the gear teeth. The camming action of the present device allows smaller gear teeth to be used for torque transmission because a portion of the torque is transferred through the traction of the rolling contacts.

Lobed Gears

Reasonable performance has been shown with a relatively simple gear tooth profile that uses a sine wave shape gear form. This shape can be a pure sine wave or an approximate sine wave such as a series of linked arcs which form lobes. With a high enough number of lobes, the height of the teeth is short enough to reduce the sliding motion between the gear teeth while providing enough surface area at the tips and roots of the lobes in the radial direction for smooth rolling contact. For example, the lobe height may be less than 1/20, 1/30 or 1/40 of a radius of a gear, for example an inner roller gear or outer roller gear. The use of a high helix angle provides a consistent radial contact and consistent torque transmission surface area in the tangential direction. When this lobed shape is used with the self camming geometry of the present device, the traction angle will determine how much of the torque transmission is provided by the tangential contact and how much is provided via traction of the tooth roots in semi-rolling contact with the tooth tips.

Torque Transmission

Figure 11:
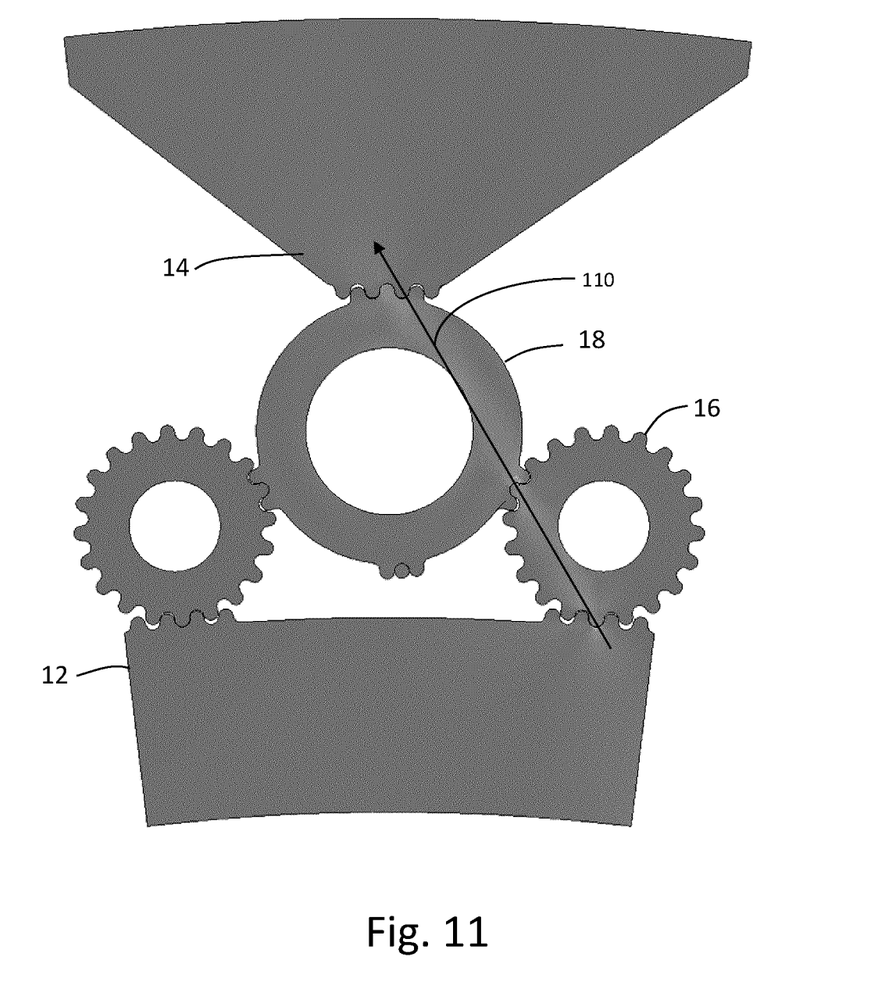
FIG. 11 is a schematic cross section of an exemplary gearbox with hollow rollers showing a path between an inner ring and an outer ring.

Embodiment of the device display very rigid torque transmission, even when constructed from plastic. The rotational stiffness potential of embodiments of the device are believed to be much higher than is possible form a conventional planetary gear train. This is because the torque is transferred from the inner gear to the outer gear through an array of nearly straight line though the inner and outer gears. This straight line torque transfer is shown in a simplified FEA analysis in FIG. 11. An arrow is added to mark the line of stress 110 which is shown as lighter shading in FIG. 11.

Increased radial preload may increase stiffness, but it will also increase rolling friction. Increased rolling friction is not always beneficial, but there are cases where it is helpful. In machining, for example, it is desirable to prevent backdriving of the gearbox as a result of tool load or vibration. In other uses, like applications where a safety brake is needed, high preload can be used to make the gearbox non-backdriveable below a certain backdrive torque. This reduces the cost and complexity and power consumption of a brake which must be disengaged with an electric current, for example.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A speed change device comprising:
    an inner race having an outer surface;
    an outer race having an inner surface;
    a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers;

a permanent magnet carried by a magnet carrying inner roller of the inner rollers or a magnet carrying outer roller of the outer rollers; and a stator having electromagnetic elements for interacting with the permanent magnet to drive the orbital rollers.

2. The speed change device of claim 1 in which each of the inner and outer rollers carries a respective permanent magnet.

3. A speed change device comprising:
an inner race having an outer surface;
an outer race having an inner surface;
a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers;
the inner rollers and outer rollers being geared, with cylindrical sections between gear meshes and wherein the cylindrical sections are formed at the pitch circle of the inner rollers and the outer rollers.

4. The speed change device of claim 1 in which the permanent magnet comprises two permanent magnets axially located by an axial location element within the magnet carrying inner roller or the magnet carrying outer roller.

5. The speed change device of claim 4 where the magnets are spaced by an axial location element and a soft magnetic material disk is located between them.

6. The speed change device of claim 1 in which the inner and outer rollers are geared and the rolling contact is geared contact.

7. The speed change device of claim 6 in which each of the inner and outer rollers have plural axial portions, the plural axial portions of each respective roller having different helix angle.

8. The speed change device of claim 1 in which the electromagnetic elements comprise poles.

9. The speed change device of claim 8 in which the poles comprise one of: posts or air cores.

10. The speed change device of claim 8 in which the number of poles of the stator is divisible by 3.

11. The speed change device of claim 10 in which the number of poles of the stator is divisible by 12.

12. The speed change device of claim 10 in which the number of orbital rollers containing magnets differs from the number of poles of the stator by plus or minus 2.

13. The speed change device of claim 10 in which the number of orbital rollers containing magnets differs from the number of poles of the stator by plus or minus 4.

14. A speed change device comprising:
an inner race having an outer surface;
an outer race having an inner surface;
a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers;
a first axial portion of the inner race having first inner race lobes, the inner rollers having first inner roller lobes configured to mesh with the first inner race lobes, the first inner race lobes having a first helix angle at the first axial portion of the inner race; and
a second axial portion of the inner race having second inner race lobes, the inner rollers having second inner roller lobes configured to mesh with the second inner race lobes, the second inner race lobes having a second helix angle at the second axial portion of the inner race different from the first helix angle.

15. The speed change device of claim 14 in which the first inner race lobes extend continuously between the first axial portion and the second axial portion to link with the second inner race lobes so that the first inner race lobes are the second inner race lobes, and the first inner roller lobes extend continuously to link with the second inner roller lobes so that the first inner roller lobes are the second inner roller lobes.

16. A speed change device comprising:
an inner race having an outer surface;
an outer race having an inner surface;
a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers;
a first axial portion of the outer race having first outer race lobes, the outer rollers having first outer roller lobes configured to mesh with the first outer race lobes, the first outer race lobes having a first helix angle at the first axial portion of the outer race; and
a second axial portion of the outer race having second outer race lobes, the outer rollers having second outer roller lobes configured to mesh with the second outer race lobes, the second outer race lobes having a second helix angle at the second axial portion of the outer race different from the first helix angle.

17. The speed change device of claim 16 in which the first outer race lobes extend continuously between the first axial portion and the second axial portion to link with the second outer race lobes so that the first outer race lobes are the second outer race lobes.

18. The speed change device of claim 16 in which the first outer roller lobes extend continuously to link with the second outer roller lobes so that the first outer roller lobes are the second outer roller lobes.

19. A speed change device comprising:
an inner race having an outer surface;
an outer race having an inner surface;
a set of orbital rollers including inner rollers in rolling contact with the outer surface of the inner race and outer rollers in rolling contact with the inner surface of the outer race, each and every inner roller being in rolling contact with two outer rollers, and each and every outer roller being in rolling contact with two inner rollers; and at least one of:
(a) the inner race having inner race lobes or gears, the inner rollers having inner roller lobes or gears configured to mesh with the inner race lobes or gears, the inner roller lobes or gears providing an effective pressure angle between the inner race lobes or gears and the inner roller lobes or gears to provide a self-energizing effect; or
(b) the outer race having outer race lobes or gears, the outer rollers having outer roller lobes or gears configured to mesh with the outer race lobes or gears, the outer roller lobes having providing an effective pressure angle between the outer race lobes or gears and the outer roller lobes or gears to provide a self-energizing effect.

20. The speed change device of claim 3 in which the cylindrical sections are formed by adding a tooth profile only to the inner side of the pitch circle of the inner rollers and to the outer side of the pitch circle of the outer rollers.

21. The speed change device of claim 3 in which the cylindrical sections are formed by adding a tooth profile only to the inner side of the pitch circle of the outer rollers and to the outer side of the pitch circle of the inner rollers.

22. The speed change device of claim 3 in which the gears are helical.

\* \* \* \* \*